R. G. DONALDSON.
UNDERFEED STOKER.
APPLICATION FILED JULY 23, 1918.

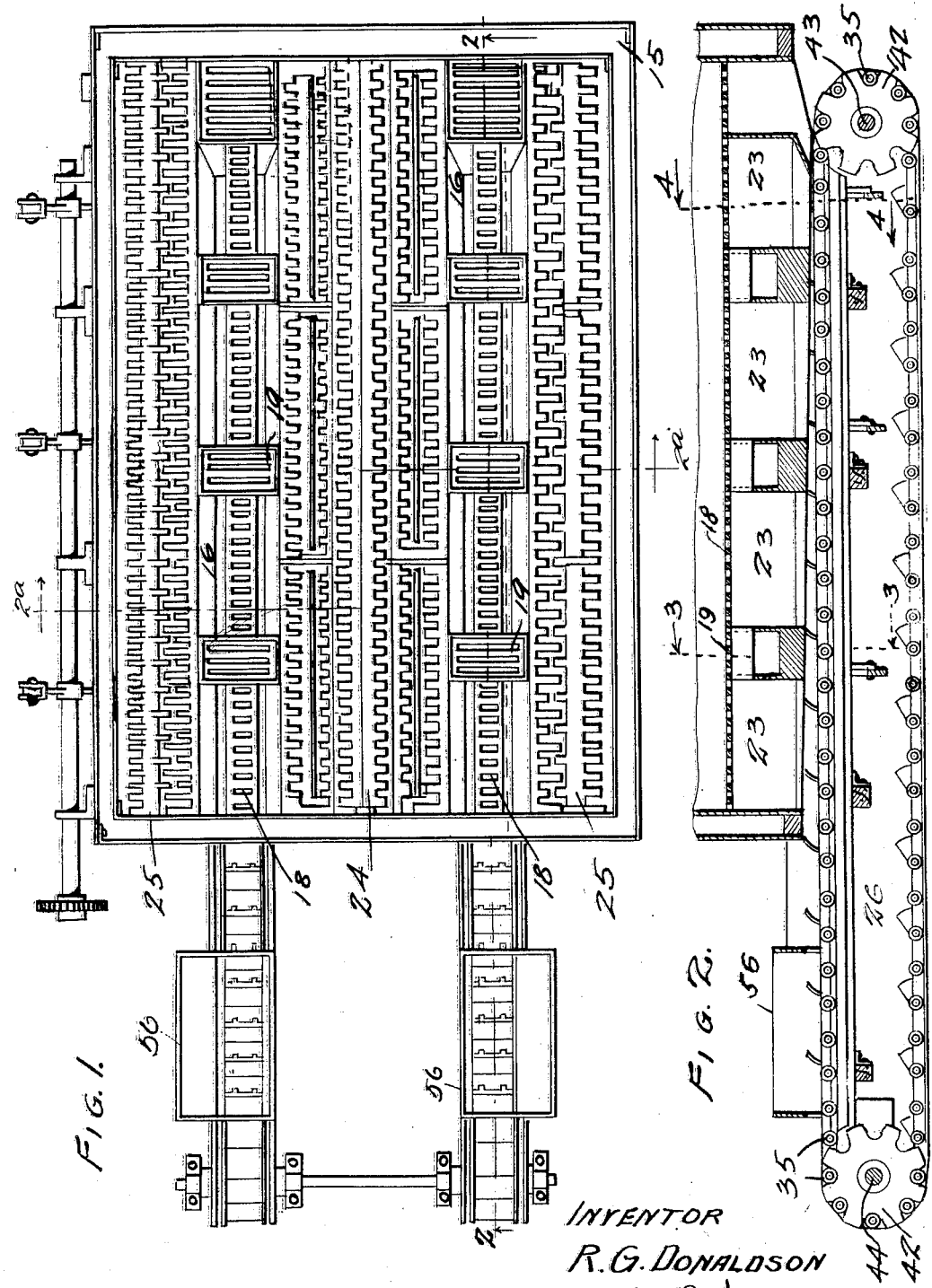

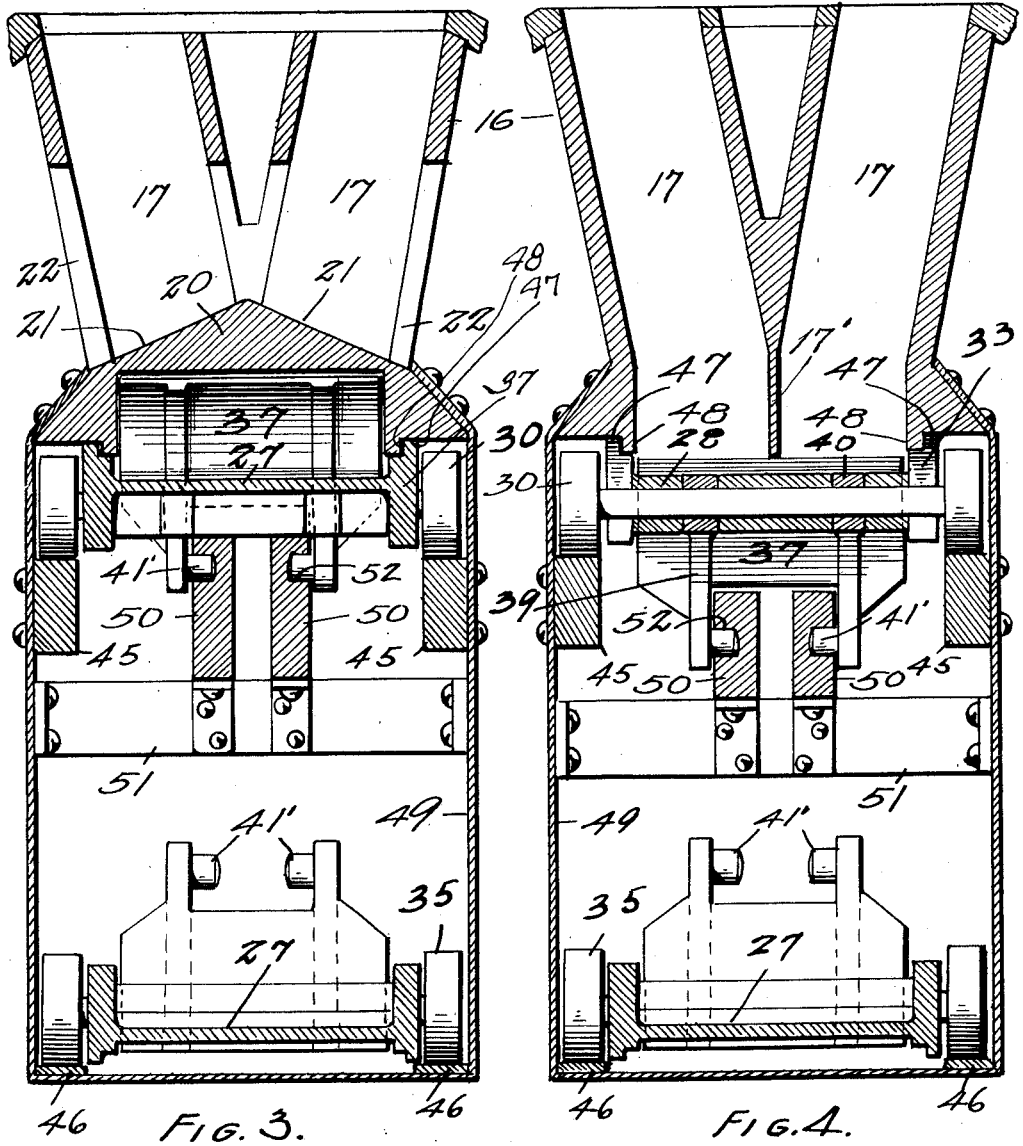

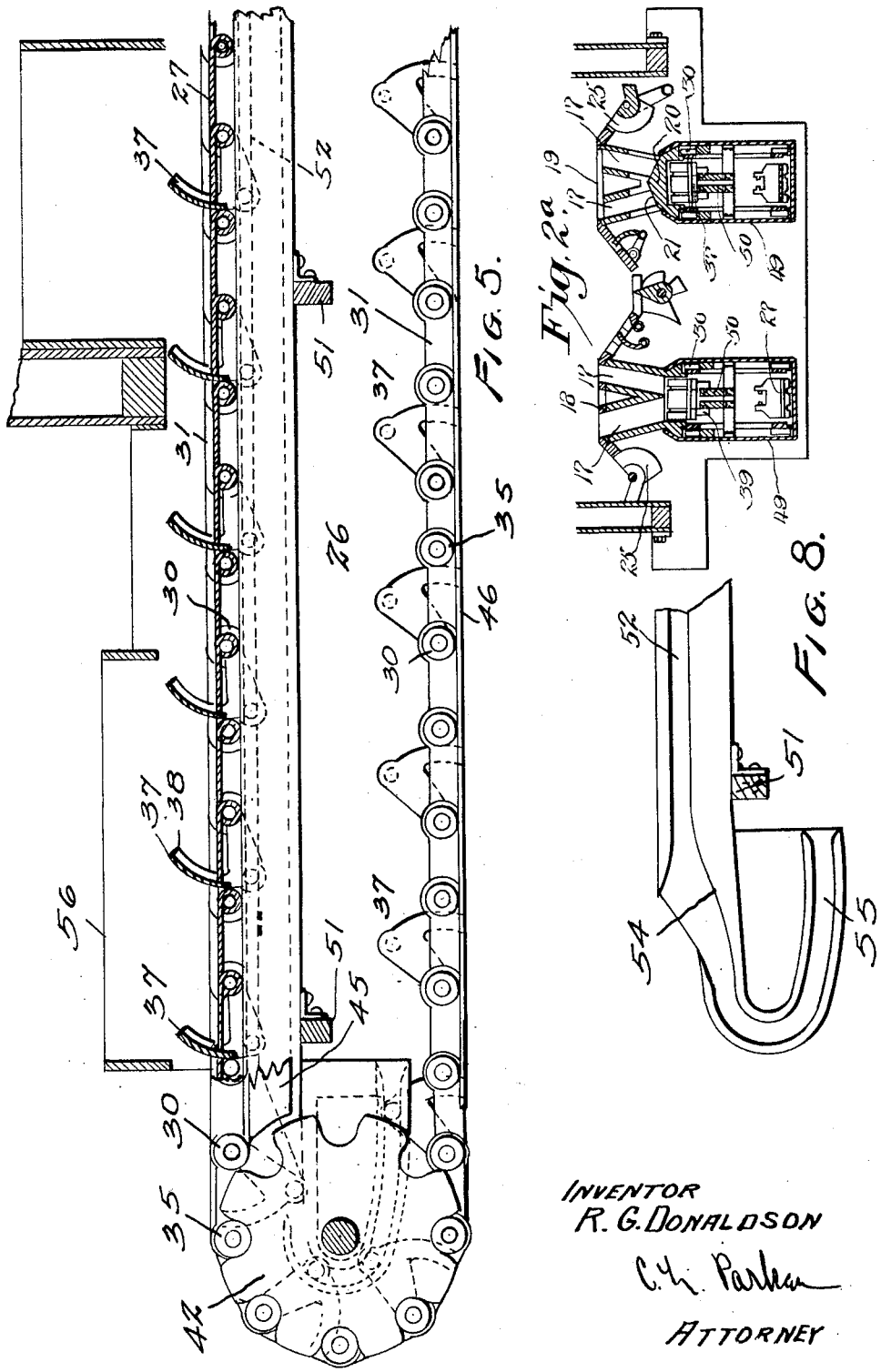

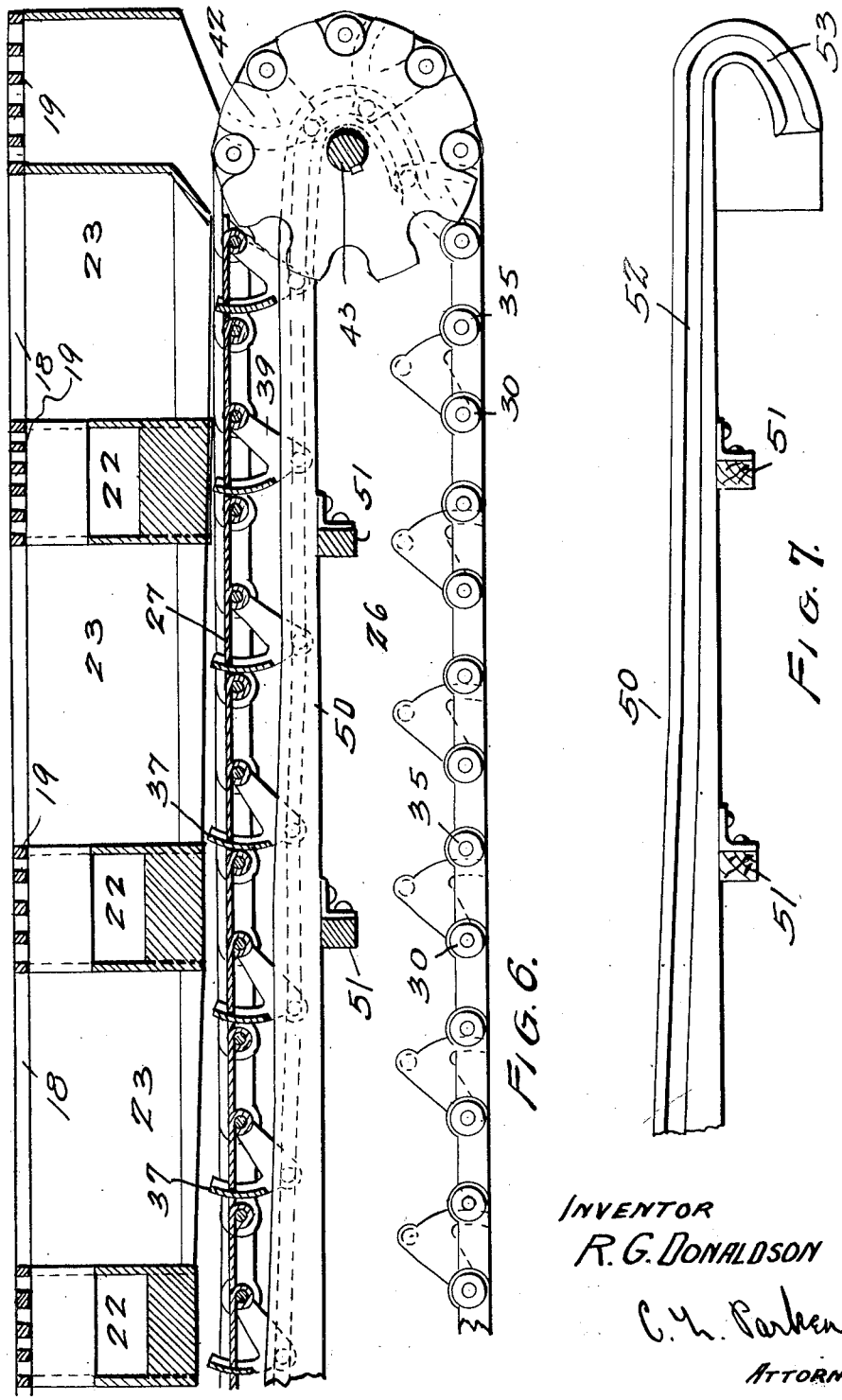

1,355,739.

Patented Oct. 12, 1920.
5 SHEETS—SHEET 5.

INVENTOR
R. G. DONALDSON

ATTORNEY

UNITED STATES PATENT OFFICE.

ROY G. DONALDSON, OF CRESTLINE, OHIO.

UNDERFEED STOKER.

1,355,739.   Specification of Letters Patent.   Patented Oct. 12, 1920.

Application filed July 23, 1918. Serial No. 246,363.

*To all whom it may concern:*

Be it known that I, ROY G. DONALDSON, a citizen of the United States, residing at Crestline, in the county of Crawford and State of Ohio, have invented certain new and useful Improvements in Underfeed Stokers, of which the following is a specification.

My invention relates to improvements in underfeed stokers for use in connection with railway locomotives, stationary boilers and the like.

An important object of the invention is to provide an underfeed stoker which will feed coal or the like upon the upper surface of the grate, in a highly efficient manner.

Other objects and advantages of the invention will be apparent during the course of the following description.

In the accompanying drawings forming a part of this specification and in which like numerals are employed to designate like parts throughout the same, Figure 1 is a plan view of apparatus embodying my invention, Fig. 2 is a longitudinal sectional view taken on line 2—2 of Fig 1, Fig. 2ª is a transverse section taken on line 2ª—2ª of Fig. 1.

Figure 9:
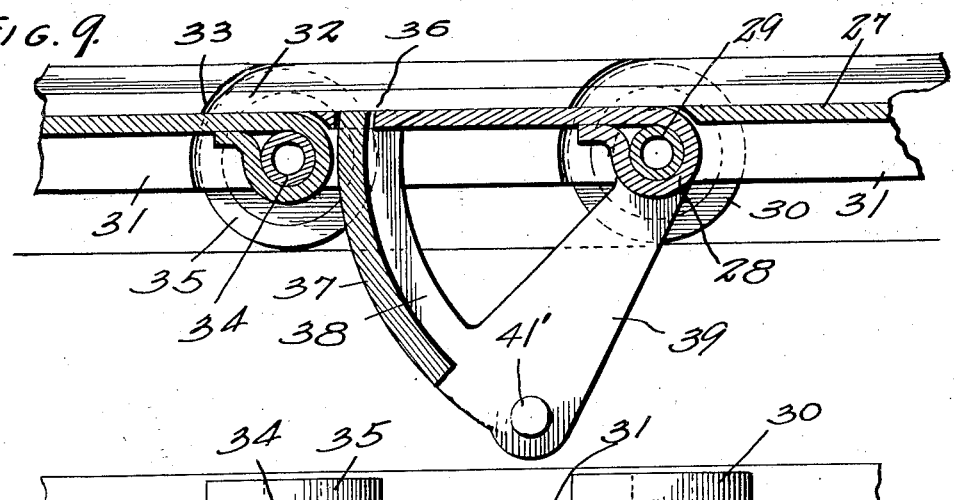
Figure 10:
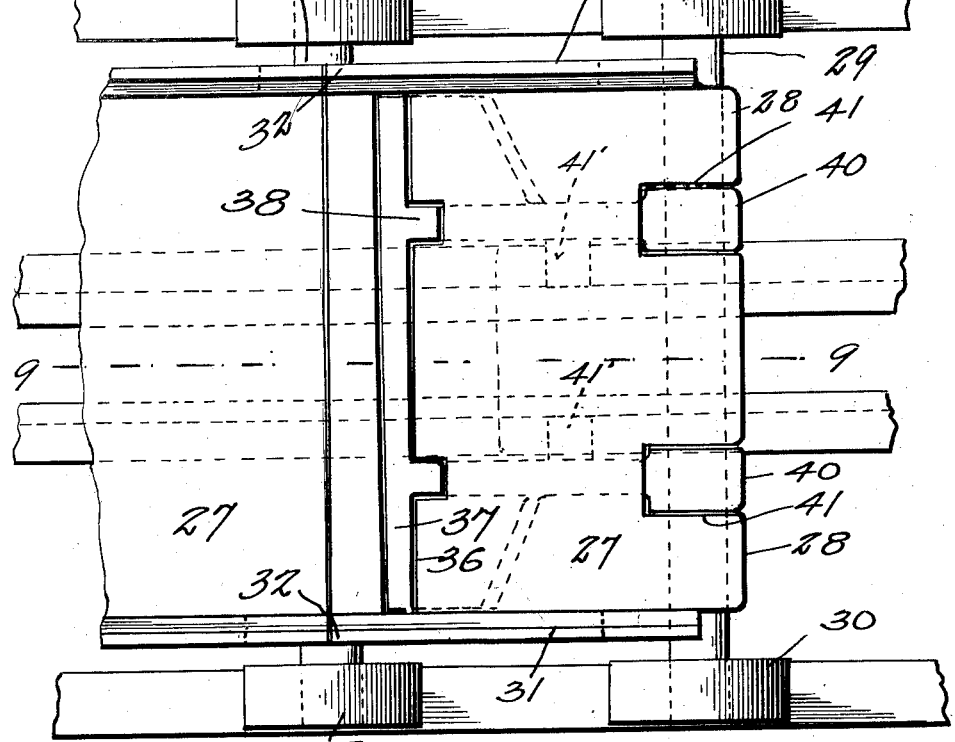

Fig. 3 is a vertical transverse sectional view through one of the feed hoppers, and associated elements, taken on line 3—3 of Fig. 2, Fig. 4 is a similar view taken on line 4—4 of Fig. 2, Fig. 5 is an enlarged side elevation of the rear end of the endless conveyer, parts being shown in sections, Fig. 6 is a similar view of the forward end thereof, parts being shown in section, Fig. 7 is a side elevation of the discharge end of the cam track, Fig. 8 is a similar view of the intake end of the cam track, Fig. 9 is a longitudinal section taken on line 9—9 of Fig. 10, and, Fig. 10 is a plan view of a section of the endless conveyer, showing the construction of the plates embodied therein.

In the drawings, wherein for the purpose of illustration is shown a preferred embodiment of my invention, the numeral 15 designates a preferably rectangular frame, within which are arranged an alined group or system of longitudinal fuel discharging hoppers 16, each hopper, as clearly shown in Figs. 3 and 4, embodying upwardly diverging passages 17 separated by a vertical web 17' the lower edge of which is inclined, as shown. Arranged upon and between the upper end of the passages 17 in each hopper are longitudinal grate sections 18, and transverse grate sections 19, are disposed between the ends of the longitudinal grate sections. Beneath the transverse grate sections 19 the lower ends of the passages 17 are closed by a deflector 20, having inclined faces 21, extending downwardly toward openings 22 formed in the side walls of the passages, whereby ashes may discharge through the grate sections 18. The deflectors 20 serve to divide the passages 17 into longitudinal sections 23, as clearly shown in Fig. 2.

Arranged between the longitudinal hoppers are grate sections 24 and grate sections 25 are disposed outwardly of the same. These grate sections will not be described in detail as they are not claimed *per se* in this application but are fully described and claimed in my copending application for grate, filed July 23rd, 1918, Serial No. 246,362.

Extending longitudinally of and beneath each hopper 16 is a longitudinal endless feed conveyer 26. This endless conveyer embodies a plurality of transverse plates 27, shown more clearly in Figs. 9 and 10. Corresponding ends of these plates are bent to form eyes or knuckles 28, pivotally receiving transverse shafts 29, carrying wheels 30. The opposite longitudinal edges of the plates 27 are provided with vertical flanges 31, projecting above and below the same, as shown. The rear ends of the flanges 31 are spaced from the rear ends of the plates, while the forward ends 32 of the flanges extend beyond the forward ends of the plates, into recesses 33, formed in the rear ends of the preceding plates. The forward ends 32 are apertured for pivotally receiving transverse shafts 34, carrying wheels 35. It is thus apparent that the forward and rear ends of the transverse plates are pivotally connected.

Each alternate plate 27 is provided near its rear end with a transverse opening 36, for the reception of a coal feeding element or grip 37. This feeding element or grip is transversely curved, as shown, and reinforced by ribs 38, formed integral with cranks 39. The cranks 39 have apertured heads 40, fitting within openings 41 formed in the rear end of each alternate plate and pivoted upon the shaft 29. The cranks 39 are provided with inwardly projecting pins or trunnions 41', for a purpose to be described.

The endless conveyers travel about toothed wheels 42, the wheels 35 fitting between the teeth, as shown. The wheels 42 are secured to transverse shafts 43 and 44, which are journaled through suitable bearings. Power may be applied to the shaft 44 by any suitable means. The wheels 30 and 35 between the toothed wheels 42, travel upon upper rails 45, and lower rails 46.

As more clearly shown in Figs. 3 and 4, the flanges 31 are provided with tongues 47, interfitting with tongues 48.

The rails 45 and 46 and associated elements are inclosed within a housing 49, to exclude ashes and the like from the same, as much as possible.

Extending longitudinally within and through the casing 49 are cam tracks 50, rigidly secured to transverse members 51. These cam tracks are provided with longitudinal grooves 52, formed upon the outer sides thereof, for the reception of the pins or trunnions 41'. As shown in Fig. 7, the cam tracks 50 are inclined and the discharge end of the groove 52 is curved downwardly as shown at 53. As shown in Fig. 8, the intake end of the groove 52 has an elevating surface 54, and the groove is extended in the form of a downwardly projecting portion 55.

During the travel of the endless conveyer, the pins 41' operate within the cam grooves 52, and as the coal feeding elements or grips approach the rear end of the grate, they are gradually drawn downwardly, until the upper ends thereof become flush with the upper surface of the belt, as shown in Fig. 9. The pins remain within the curved portions 53 of the cam track and as the feeding elements 38 travel about the toothed wheels 42, they are inverted. These feeding elements now travel in an inverted manner, forwardly toward the forward toothed wheels 42, and upwardly about the same. The pins 41' enter the cam groove portions 55 and securely hold the feeding elements against turning movement while they are again restored to the upwardly projecting position. When the pins 41' contact with the elevating faces 54, they are guided into the elevated end of the cam slots 52, whereby the feeding elements are again returned to the uppermost position.

The coal is fed into hoppers 56 through which the upper flights of the conveyers travel, as shown.

The operation of the apparatus is as follows:

The coal within the hoppers 56 is engaged by the feeding elements or grips 37 and caused to travel longitudinally with the conveyer. As the conveyer passes beneath the sections 23 of the passage 17, the coal is fed or worked upwardly through the same, whereby the coal is finally discharged upon grates. As the feeding elements travel forwardly with the endless conveyer, they are gradually drawn downwardly, as explained.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:

1. In an underfeed stoker, a longitudinal fuel discharging hopper embodying upwardly diverging passages and an upstanding web separating the passages, longitudinally spaced deflectors serving to close the lower ends of the passages at spaced intervals, said deflectors having oppositely extending faces which are inclined downwardly toward the outer ends, said passages being provided in their outer side walls with openings, arranged adjacent the lower ends of said inclined faces, and an endless conveyer operating near and beneath the lower ends of the passages and carrying fuel feeding elements.

2. In an underfeed stoker, a longitudinal fuel discharging hopper embodying upwardly diverging passages, longitudinally spaced deflectors serving to close the ends of the passages at spaced intervals, said deflectors having oppositely extending faces which are inclined downwardly toward their outer ends, said passages being provided in their outer side walls with openings arranged adjacent the lower ends of said inclined faces, an endless conveyer operating near and beneath the lower ends of said passages, fuel feeding elements pivotally connected with the endless conveyer and adapted to project above the same, means to draw the fuel feeding elements downwardly with respect to the endless conveyer as they approach the discharge end of the endless conveyer, means to feed fuel upon the take-up end of the endless conveyer, grate sections arranged between the upper ends of said passages, and grate sections arranged above said deflectors.

3. In an underfeed stoker, a longitudinal fuel discharging hopper embodying upwardly diverging passages, an endless conveyer operating near and beneath the lower ends of said passages, said endless conveyer having spaced openings formed therein, curved fuel feeding elements operating within the spaced openings of the conveyer, and adapted to project above said conveyer, cranks connected with the fuel feeding elements and pivotally connected with the conveyer, elements carried by the cranks near their outer ends, cam tracks extending longitudinally of the conveyer and having longitudinal grooves which are inclined and receive said elements carried by the cranks, said grooves extending downwardly toward the discharge end of the conveyer, and means to feed fuel to the intake end of the conveyer.

4. In an underfeed stoker, a longitudinal fuel discharging hopper, an endless conveyer operating near and beneath the hopper, said endless conveyer embodying a plurality of plates, each plate being provided at its edges with longitudinal flanges which terminate inwardly of one end of the plate and project beyond the opposite end of the plate, said plate being provided with a transverse opening arranged near and spaced from one end thereof, said plate being further provided near one end with spaced knuckles and having the opposite ends of its flanges apertured, transverse shafts extending through said knuckles and the apertured ends of the flanges for pivotally connecting the plates, wheels carried by the transverse shafts, tracks upon which the wheels travel, longitudinally curved fuel feeding elements operating within the transverse openings of said plates, cranks connected with the fuel feeding elements and pivoted upon the transverse shafts and arranged between the apertured knuckles, pins carried by the outer ends of the cranks, cam tracks arranged beneath the upper portion of the endless conveyer and extending longitudinally thereof and having longitudinal grooves for the reception of said pins, said grooves being inclined gradually throughout their entire length and extending downwardly toward the discharge end of the endless conveyer, said grooves being curved at their ends, and means to feed fuel to the intake end of the conveyer.

In testimony whereof I affix my signature.

ROY G. DONALDSON.